United States Patent [19]
Buljan

[11] Patent Number: 5,460,640
[45] Date of Patent: * Oct. 24, 1995

[54] ALUMINA-RARE EARTH OXIDE CERAMIC-METAL BODIES

[75] Inventor: Sergej-Tomislav Buljan, Acton, Mass.

[73] Assignee: Valenite Inc., Madison Heights, Mich.

[*] Notice: The portion of the term of this patent subsequent to Jun. 8, 2010 has been disclaimed.

[21] Appl. No.: 931,075

[22] Filed: Aug. 17, 1992

Related U.S. Application Data

[63] Continuation-in-part of Ser. No. 914,914, Jul. 16, 1992, Pat. No. 5,279,191, which is a continuation-in-part of Ser. No. 693,492, Apr. 30, 1991, Pat. No. 5,216,845, and a continuation-in-part of Ser. No. 701,302, May 13, 1991, Pat. No. 5,271,758, which is a continuation-in-part of Ser. No. 595,065, Oct. 10, 1990, abandoned.

[51] Int. Cl.$^6$ .................. C22C 29/02; C22C 29/12; C22C 29/18; B31B 1/00; B23B 1/00
[52] U.S. Cl. .................. 75/233; 75/235; 75/237; 75/238; 75/245; 75/249; 75/951; 419/10; 419/11; 419/12; 419/13; 419/14; 419/15; 419/16; 419/19; 419/20; 419/23; 419/24; 419/36; 419/38; 419/42; 419/48; 419/49; 82/1.11; 407/119
[58] Field of Search .................. 82/1.11, 47; 51/281 R, 51/307, 309; 407/119; 75/233, 235, 236, 237, 238, 245, 249, 951; 419/10, 11, 12, 13, 14, 15, 16, 19, 20, 23, 24, 36, 38, 42, 48, 49

[56] References Cited

U.S. PATENT DOCUMENTS

| | | | |
|---|---|---|---|
| 4,497,228 | 2/1985 | Sarin et al. | 82/1 |
| 4,919,718 | 4/1990 | Tiegs et al. | 75/232 |
| 5,041,261 | 8/1991 | Buljan et al. | 419/11 |
| 5,053,074 | 10/1991 | Buljan et al. | 75/236 |
| 5,089,047 | 2/1992 | Buljan et al. | 75/236 |
| 5,216,845 | 6/1993 | Buljan et al. | 51/281 R |
| 5,271,758 | 12/1993 | Buljan et al. | 75/232 |
| 5,279,191 | 1/1994 | Buljan | 82/1.11 |

FOREIGN PATENT DOCUMENTS

| | | | |
|---|---|---|---|
| 0062311 | 10/1982 | European Pat. Off. | C22C 29/00 |
| 49127806 | 12/1974 | Japan . | |
| 2071906 | 3/1990 | Japan . | |

*Primary Examiner*—Donald P. Walsh
*Assistant Examiner*—Daniel Jenkins
*Attorney, Agent, or Firm*—John W. Gregg

[57] ABSTRACT

A fully dense ceramic-metal body including 40–88 v/o of an oxide hard phase of, in v/o of the body, 4–88 v/o M-aluminum binary oxides, where the binary oxide has a C-type rare earth, garnet, $\beta$-$MAl_{11}O_{18}$, or perovskite crystal structure, and M is a lanthanide or indium; and 0–79 v/o $\alpha$-alumina; about 10–50 v/o of a hard refractory carbide, nitride, or boride as a reinforcing phase; and about 2–10 v/o of a dispersed metal phase combining Ni and Al mostly segregated at triple points of the microstructure. The preferred metal phase contains a substantial amount of the $Ni_3Al$ ordered crystal structure. In the preferred body, the reinforcing phase is silicon carbide partially incorporated into the oxide grains, and bridges the grain boundaries. The body including a segregated metal phase is produced by densifying a mixture of the hard phase components and the metal component, with the metal component being present in the starting formulation as Ni powder and Al powder. The body may be used as a cutting tool for machining nickel superalloys or cast iron at speeds up to about 1000 sfm, feed rates up to about 0.012 in/rev, and depth of cut up to about 0.10 inches.

23 Claims, 2 Drawing Sheets

ALUMINA-RARE EARTH OXIDE CERAMIC-METAL BODIES

CROSS REFERENCE TO RELATED APPLICATIONS

This application is a continuation-in-part of commonly assigned, U.S. Patent application Ser. No. 07/914,914, filed Jul. 16, 1992 now U.S. Pat. No. 5,279,191 by S.-T. Buljan, which is a continuation-in-part of U.S. patent application Ser. Nos. 07/693/492, filed Apr. 30, 1991, now U.S. Pat. No. 5,216,845 and 07/701,302, filed May 13, 1991 now U.S. Pat. No. 5,271,758. Each application Ser. Nos. 07/693,492 and of 07/701,302 is a continuation-in-part of U.S. patent application Ser. No. 07/595,065 filed Oct. 10, 1990 and now abandoned. Application Ser. Nos. 07/595,065, 07/693,492, and 0/701,302 are incorporated herein by reference.

This application is also related to commonly assigned U.S. patent application Ser. Nos. 07/576,241, filed Aug. 31, 1990 and now abandoned; 07/632,237 and 07/632,238, both filed Dec. 20 1990 now U.S. Pat. Nos. 5,053,074 and 5,089,047 respectively; and 07/635,408, filed Dec. 21, 1990 now U.S. Pat. No. 5,841,261.

BACKGROUND OF THE INVENTION

This invention relates to oxide ceramic bodies for use as cutting tools, wear parts, and the like. The bodies contain at least one indium/aluminum or rare earth/aluminum binary oxide optionally mixed with α-alumina, a reinforcing phase, and a dispersed metal phase. In particular the invention relates to such bodies containing a metal phase including both nickel and aluminum. The invention also involves methods for preparation and use of such bodies.

Ceramic-metal or cermet tools for steel machining have greatly improved the productivity and efficiency of the metal removal process. The performance of a number of cermet materials, which principally are based on refractory metal carbides or nitrides bonded with cobalt, nickel, molybdenum, or alloy binders, inherently is limited by the chemical interaction between the hard phase and steel workpiece materials. This becomes particularly evident as increased cutting speeds generate more heat, increasing the chemical reactivity of both the tool material and the workpiece. Such chemical reactions between the cutting tool and steel workpiece accelerate wear and reduce crater resistance of the tool.

Attempts have been made to utilize alumina ceramics and alumina-based composites such as alumina-titanium carbide composites for use as cutting tools for steel machining. The broader use of this class of materials, however, has been restricted by their inherent brittleness.

Of particular concern has been the need for cutting tools suitable for machining of high nickel superalloys. The high temperature nickel based superalloys, for example Inconel® alloys (available from Huntington Alloys, Inc., Huntington, W. Va.), present the advantages of deformation resistance and retention of high strength over a broad range of temperatures. Because of their high strength at elevated temperatures, however, these alloys are much more difficult to machine than steels.

Ceramic-metal (cermet) tools, for the most part, have shown only limited effectiveness in machining of nickel based alloys. These cermet materials are based principally on refractory metal carbides or nitrides bonded with cobalt, nickel, molybdenum, or alloy binders. Commercially available cutting tools, for example cobalt cemented tungsten carbide, can be utilized for such machining only at relatively low cutting speeds and hence provide low productivity.

Attempts have been made to utilize alumina ceramics and alumina-based composites such as alumina-titanium carbide composites for use as cutting tools for high temperature nickel based superalloy machining. The use of this class of materials, however, has been restricted by their inherently low fracture toughness, limiting the usable feed rate and depth of cut. Alumina-silicon carbide whisker composites have provided some increase in fracture toughness, but the whisker component, due to its fibrous nature, requires extremely careful handling to assure safety.

Accordingly, it would be of great value to find a cutting tool suitable for machining difficult-to-work metals such as high temperature nickel based superalloys using a cutting tool body which exhibits improved chemical wear resistance and performance when compared to conventional ceramic metal-cutting tool materials, improved fracture toughness compared to known alumina-titanium carbide composites, and improved ease of fabrication compared to known alumina-silicon carbide whisker composite materials. The body described herein is directed to achieving such a cutting tool.

SUMMARY OF THE INVENTION

In one aspect, the present invention is a ceramic-metal body having a density of at least about 95% of theoretical density. The body includes about 40–88 volume percent (v/o) of an oxide hard phase consisting essentially of, in v/o based on the total volume of the body, about 4–88 v/o of at least one M-aluminum binary oxide having a crystal structure selected from the group consisting of C-type rare earth, garnet, $\beta$-MAl$_{11}$O$_{18}$, or perovskite; 0 to about 79 volume percent of granular α-alumina; and 0 to less than 5 volume percent of one or more other oxides selected from the group consisting of magnesia, zirconia, yttria, hafnia, and silica. M is a lanthanide or indium. The body also includes about 10–50 v/o of a refractory reinforcing hard phase consisting essentially of one or more materials selected from the carbides, nitrides, oxycarbides, and oxynitrides of titanium, zirconium, hafnium, niobium, tantalum, tungsten, and silicon; borides of titanium, tantalum, hafnium, and tungsten; and combinations thereof. The body further includes about 2–10 v/o of a metal phase consisting essentially of a combination of nickel and aluminum having a ratio of nickel to aluminum of from about 70:30 to about 90:10 by weight and 0–5 weight percent (w/o) of an additive selected from titanium, zirconium, hafnium, vanadium, niobium, tantalum, chromium, molybdenum, tungsten, cobalt, boron, carbon, and combinations thereof. The metal phase is a non-continuous, dispersed metal phase, and at least a major portion of the non-continuous, dispersed metal phase is segregated at triple points defined by grain surfaces of the hard phases.

In a narrower aspect of the invention, equiaxed particles are included in the reinforcing hard phase in an amount of no more than 20 v/o of the body, the remainder of the reinforcing hard phase being platelets, elongated grains, or a combination thereof.

In another narrower aspect of the invention, the body includes silicon carbide in the form of platelets or elongated grains as the reinforcing hard phase, and at least a portion of the silicon carbide is partially incorporated into grains of the oxide phase and bridges the grain boundaries of the microstructure of the body.

In another aspect, the invention is a method for machining a workpiece involving the steps of turning the workpiece on a lathe at an effective cutting speed of up to about 1000 surface feet per minute, moving a ceramic-metal cutting tool across the face of the workpiece at a feed rate of up to about 0.012 inches per revolution, and cutting the workpiece with the ceramic-metal cutting tool to effect a depth of cut of up to about 0.10 inches per pass. The ceramic-metal cutting tool has a density of at least about 95% of theoretical. The tool includes about 40–88 v/o of an oxide hard phase consisting essentially of, in v/o based on the total volume of the cutting tool, about 4–88 v/o of at least one M-aluminum binary oxide having a crystal structure selected from the group consisting of C-type rare earth, garnet, $\beta$-MAl$_{11}$O$_{18}$, or perovskite; 0 to about 79 volume percent of granular $\alpha$-alumina; and 0 to less than 5 volume percent of one or more other oxides selected from the group consisting of magnesia, zirconia, yttria, hafnia, and silica. M is a lanthanide or indium. The tool also includes about 10–50 v/o of a refractory reinforcing hard phase consisting essentially of one or more materials selected from the carbides, nitrides, oxycarbides, and oxynitrides of titanium, zirconium, hafnium, niobium, tantalum, tungsten, and silicon; borides of titanium, tantalum, hafnium, and tungsten; and combinations thereof. The tool further includes about 2–10 v/o of a metal phase consisting essentially of a combination of nickel and aluminum and 0–5 weight percent (w/o) of an additive selected from titanium, zirconium, hafnium, vanadium, niobium, tantalum, chromium, molybdenum, tungsten, cobalt, boron, carbon, and combinations thereof. The ratio of nickel to aluminum is about 70:30 to about 90:10 by weight. The metal phase is a non-continuous, dispersed metal phase, and at least a major portion of the non-continuous, dispersed metal phase is segregated at triple points defined by grain surfaces of the hard phases.

In yet another aspect, the invention is a method for the preparation of a ceramic-metal body. The method includes preparing a mixture including about 40–88 volume percent of hard refractory oxide components consisting essentially of, in volume percent based on the total volume of the body, about 4–88 of at least one M-aluminum binary oxide having a crystal structure selected from C-type rare earth, garnet, $\beta$-MAl$_{11}$O$_{18}$, or perovskite; 0 to about 79 volume percent of granular $\alpha$-alumina; and 0 to less than 5 of one or more other oxides selected from the group consisting of magnesia, zirconia, yttria, hafnia, and silica. M is selected from the group consisting of lanthanides and indium. The mixture also includes about 10–50 volume percent of one or more hard refractory reinforcing components selected from the carbides, nitrides, oxycarbides, and oxynitrides of titanium, zirconium, hafnium, niobium, tantalum, tungsten, and silicon; borides of titanium, tantalum, hafnium, and tungsten; and combinations thereof. The mixture further includes about 2–10 v/o of a metal component consisting essentially of a combination of nickel powder and aluminum powder having a ratio of nickel powder to aluminum powder of from about 70:30 to about 90:10 by weight and 0–5 w/o of an additive selected from titanium, zirconium, hafnium, vanadium, niobium, tantalum, chromium, molybdenum, tungsten, cobalt, boron, carbon, and combinations thereof. The method further includes the step of densifying the mixture to form a ceramic metal body having a density of at least 95% of theoretical density and having a granular microstructure within which the metal component forms a non-continuous, dispersed metal phase. At least a major portion of the non-continuous, dispersed metal phase is segregated at triple points defined by grain surfaces of the granular microstructure.

BRIEF DESCRIPTION OF THE DRAWINGS

For a better understanding of the present invention, together with other objects, advantages and capabilities thereof, reference is made to the following Description and appended Claims, together with the Drawings, in which:

In FIG. 1, the reinforcing hard phase is a whisker phase, while in FIG. 2 it is a platelet phase.

DETAILED DESCRIPTION OF THE PREFERRED EMBODIMENTS

Figure 1:
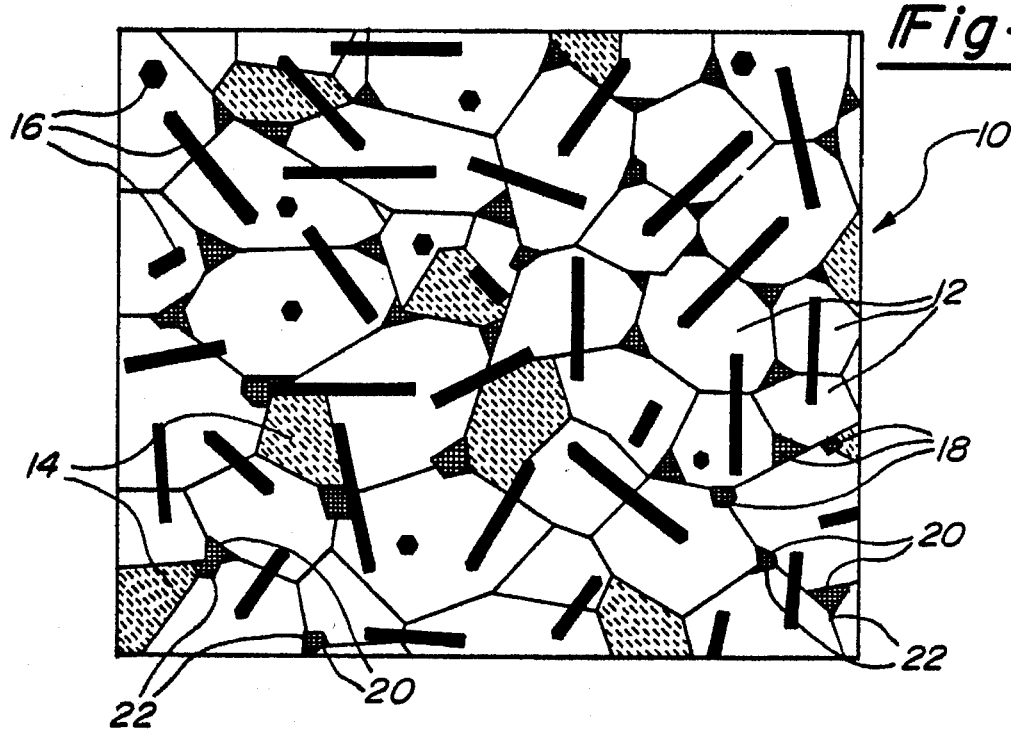
FIGS. 1 and 2 are schematic illustrations in cross-section of the microstructure of the material of bodies in accordance with different embodiments of the invention, illustrating the segregation of the metal phase at the triple points and incorporation of a portion of the reinforcing hard phase into oxide phase grains.

The fully dense ceramic materials described herein include at least two hard phases, one or more oxide hard phases and an additional, reinforcing hard phase of equiaxed or elongated grains of one or more refractory carbides, nitrides, oxycarbides, oxynitrides, borides or combinations of these.

The oxide component is present in the material in an amount of about 40–88 v/o. This component includes at least one binary oxide containing aluminum, indium or a lanthanide, and oxygen. Examples of such binary oxides are (In,Al)$_2$O$_3$, which contains no rare earth element but has a C-type rare earth crystal structure; Ln$_3$Al$_5$O$_{12}$, with a rare earth garnet structure; LnAlO$_3$, with a perovskite structure; and LnAl$_{11}$O$_{18}$, with a $\beta$-alumina structure. Typically, the LnAlO$_3$ and LnAl$_{11}$O$_{18}$ are combined to make up the rare earth oxide portion of the binary oxide component, as described below. As used herein, the term "Ln" refers to the lanthanide series rare earth elements and includes, for example, neodymium, samarium, dysprosium, erbium, and solid solutions thereof. Also as used herein, the terms "$\beta$-alumina structure" "NaAl$_{11}$O$_{17}$ structure", and the like refer to a material isostructural with NaAl$_{11}$O$_{17}$, a material commonly referred to in the art by the idealized formula "$\beta$-NaAl$_{11}$O$_{17}$" or by the term "$\beta$-alumina". This material originally was thought to be $\beta$-alumina, but subsequently was found not to be a pure alumina. The material and its crystal structure are described in more detail by G.E. Rankin et al. (*J. Amer. Cer. Soc.* 38, 568 (1916)) and W. C. Bragg et al. (*Krystallogr.* 77, 255 (1931)). Both the Rankin et al. and the Bragg et al. papers are incorporated herein by reference.

Optionally, the oxide component also includes $\alpha$-alumina. As used herein, the term "$\alpha$-alumina" is intended to mean aluminum oxide having a nominal formula Al$_2$O$_3$, which is substantially completely of the trigonal (carborundum) crystal structure, and which may (or may not) be further modified by or coexist with small amounts, i.e. less than 5 v/o, of magnesia, zirconia, yttria, hafnia, and/or silica. An example of such an addition is the addition of a small amount of MgO as a grain growth inhibiting agent. Preferably, for example in a cutting tool body, the content of silica is no more than about 2 v/o; and that of other impurities, no more than about 1 v/o. The additional, reinforcing hard phase is present in an effective amount of about 10–50 v/o, depending on the toughness and chemical resistance desired for the ceramic-metal body. Typically, the reinforcing hard phase is silicon carbide in an amount of about 30–50 v/o. Alternatively, the reinforcing hard phase may be a hard refractory carbide, nitride, oxycarbide, oxynitride, or boride of titanium, zirconium, hafnium, niobium, tantalum, tungsten, boron, silicon, or mixtures or solid solutions of these in an amount of about 10–50 v/o. Within that range, lowering the carbide content, if any, in the second phase decreases the chemical solubility of, for example, a cutting tool material with respect to ferrous alloys. Reinforcing phase carbide additions at the higher end of this range increase the toughness of the material, increasing impact and wear resistance in applications such as milling. Thus the properties of the material may, to some extent, be preselected by balancing the reinforcing hard phase components. Examples of suitable materials for the reinforcing hard phase are silicon carbide, titanium carbide, titanium nitride, hafnium carbide, hafnium nitride, tantalum carbide, tantalum nitride, tungsten carbide, boron carbide, titanium diboride, or combinations thereof.

The reinforcing hard phase may include equiaxed or nearly equiaxed grains of about 1 µm average diameter and/or acicular grains, for example whiskers, fibers, or platelets. The acicular grains may be elongated grains with an aspect ratio of about 3:1 to 10:1, length to diameter, and may be polycrystalline fibers or single crystal whiskers. Alternatively, the acicular grains may be in the form of single crystal platelets. The ratio of length to width to thickness of such platelets is preferably about 3:2:1 to 10:10:1. When combined with acicular dispersoid grains, the content of equiaxed grain reinforcing component preferably should be limited to no more than about 20 v/o of the body, to maximize the fracture strength of the body. The term "equiaxed", as used herein, refers to grains of spherical or near-spherical geometry, that is having an aspect ratio of 1:1 to 1.5:1, length to diameter.

In the preferred microstructure, any silicon carbide in the form of whiskers, fibers, or platelets is at least partially incorporated into the oxide phase grains during the densification process, linking these grains together across the grain boundaries. This linking is shown schematically in FIGS. 1 and 2, and is described further below. Incorporating platelets as a major part or all of the reinforcing hard phase presents the added advantage of simplifying the fabrication of the ceramic-metal bodies by lessening the need for added safety measures required when working with ceramic whisker or fiber components.

The hard phases coexist in the microstructure of the body with an intermetallic phase combining nickel and aluminum, in an amount of about 2–10 v/o of the starting formulation. It is essential for optimization of this material, for example for use as a cutting tool, that this metal phase include both nickel and aluminum. The metal powders added to the starting formulation include nickel in an amount of about 70–90 w/o, and aluminum in an amount of about 10–30 w/o, both relative to the total weight of the metal powder. Since nickel does not readily wet alumina, the addition of aluminum to the metal phase in an amount of less than about 10 w/o can result in a material of inferior properties. The material becomes more difficult to sinter, and the dispersion of the nickel in such a material is poor. Conversely, the addition of aluminum in an amount greater than about 30 w/o of the metal phase can lower the hardness and chemical stability of the material, also resulting in inferior properties. A minor amount of titanium, zirconium, hafnium, vanadium, niobium, tantalum, chromium, molybdenum, tungsten, cobalt, boron, and/or carbon, the total amount not to exceed about 5 w/o of the metal phase, may also be included.

The preferred composition is 12–14 w/o Al, balance Ni. In the most preferred compositions the Ni:Al ratio results in the formation of a substantially $Ni_3Al$ metal phase, having the $Ni_3Al$ ordered crystal structure. The $Ni_3Al$ ordered crystal structure may be substantially completely of the true $Ni_3Al$ phase, or this true $Ni_3Al$ phase may be only partially developed and exist in combination with one or more nickel-aluminum alloys. The $Ni_3Al$ ordered crystal structure preferably is present in an amount of at least about 40 v/o, typically about 40–80 v/o, of the metal phase. In some compositions, this ordered crystal structure may coexist with or be modified by the abovementioned additives. Thus, as used herein, the term "metal phase" does not necessarily denote a single phase, but may indicate a polyphase component of the microstructure of the body.

The best combination of properties (hardness and fracture toughness) for the articles described herein, particularly for cutting tool applications, is obtained when total metal addition is in the most preferred range of about 4–10 v/o. The beneficial effect of the low amounts described herein for the intermetallic phase is particularly unexpected, since at such lower amounts this phase is less likely to be acting as a continuous binder for the hard phases in a manner similar to known cermets, for example tungsten carbide/cobalt materials or nickel-molybdenum bonded carbides.

Figure 2:
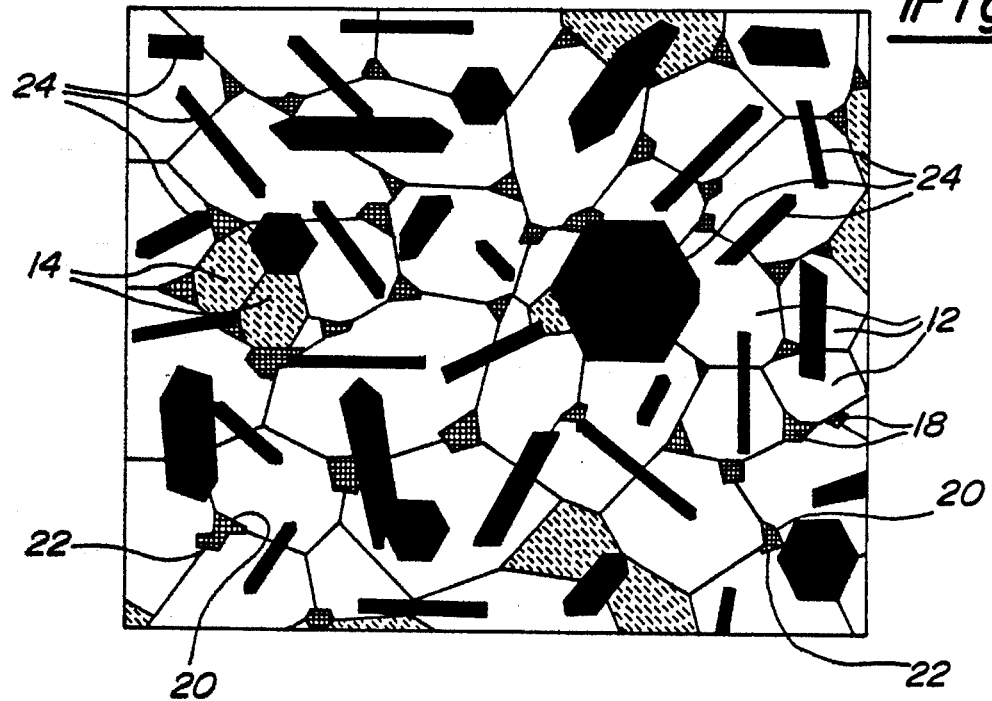

A preferred microstructure for the ceramic-metal articles described herein is schematically illustrated in FIGS. 1 and 2. FIG. 1 shows ceramic-metal material 10, including grains 12 of a hard binary oxide, alumina grains 14, silicon carbide reinforcing hard phase whiskers 16, and metal phase 18. Grains 12 and 14 make up the oxide phase, while grains 12 and 14 and whiskers 16 are the hard phases. Metal phase 18 is dispersed, non-continuous, and substantially segregated at "triple points" of the material, i.e. at points where the surfaces of at least three grains come together or would contact one another if the metallic phase were not present in the fully dense material. FIG. 1 shows metal phase 18 as segregates 20 disposed at triple points 22 between hard phase grains 12, 14, and/or 16. These finely divided segregates are made up of a combination of Ni—Al alloys with the intermetallic $Ni_3Al$ compound.

The segregation is effected by adding nickel and aluminum to the above described hard phase materials as nickel and aluminum powders rather than as the prereacted $Ni_3Al$ compound. Since nickel and nickel-rich Ni—Al alloys wet alumina poorly, the metal phase tends to segregate at the triple points, as described above.

FIG. 1 also shows a microstructure in which a significant portion of silicon carbide whiskers 16, preferably about 5–50 v/o and most preferably at least about 10 v/o, have one or both ends incorporated into oxide phase grains 12 and 14, rather than being a completely intergranular phase. Such incorporation has been observed only between silicon carbide reinforcing phase and the oxide grains. This incorporation toughens the incorporating grains at the microscopic scale. It also bridges the boundaries between grains, increasing the fracture toughness of the body on a microscopic scale. The composite bodies exhibiting a microstructure of both incorporated reinforcing hard phase and segregated metal phase exhibit unexpectedly high strength; that is a modulus of rupture as much as 50–100% higher than that of conventional composites of alumina and silicon carbide whiskers alone is observed.

FIG. 2 illustrates a microstructure similar to that shown in FIG. 1 in which like features are indicated by the same reference numerals. However, substituted for silicon carbide whiskers 16 of FIG. 1 are silicon carbide platelets 24 in FIG.

2. One or more edges or corners of platelets 24 are incorporated into oxide phase grains 12 and 14, imparting increased fracture toughness and strength similar to that described for the material of FIG. 1. Preferably about 5–50 v/o, and most preferably at least about 10 v/o of the platelets are so incorporated.

The above-described hard, fracture-resistant body is achieved only when the above-described binary oxide, reinforcing phase, metal phase, and optionally alumina are present in the ranges specified above. The preferred ranges are shown graphically in FIG. 3, with the approximate composition, in volume percent, of the body described herein bounded by and contained within the three-dimensional solid defined by points a, b, c, d, e, f, g, and h of FIG. 3. The volume percents of binary oxide, alumina, reinforcing phase, and metal phase represented by points a, b, c, d, e, f, g, and h are shown in Table I.

Figure 3:
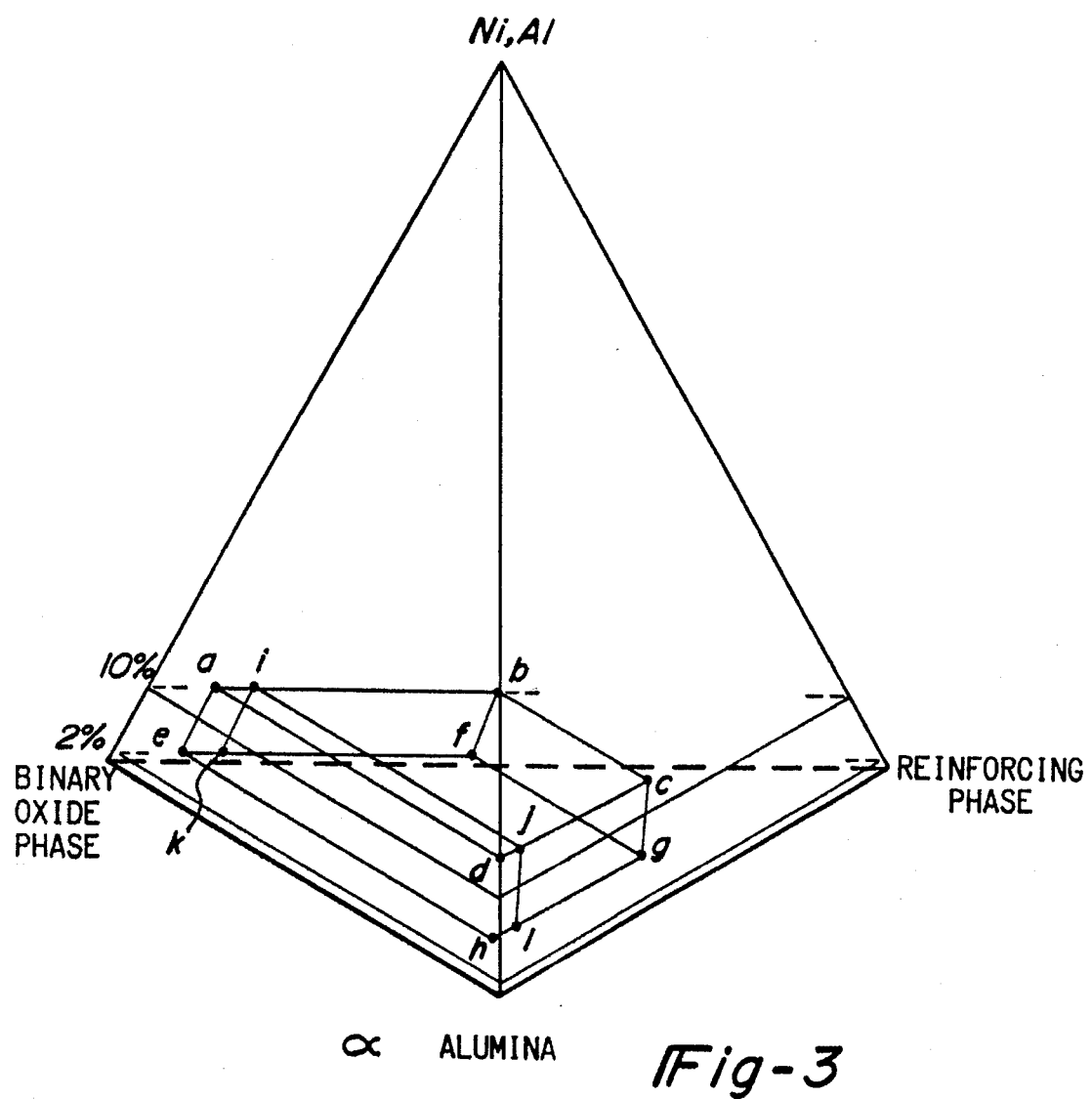
FIG. 3 is a quaternary diagram graphically depicting the proportions of the phases present in bodies in accordance with different embodiments of the invention.

The most preferred ranges for a body in which the binary oxide is (a) $(Ln,Al)_2O_3$ having a C-type rare earth crystal structure, or (b) one or both of a rare earth perovskite $LnAlO_3$ and a rare earth hexagonal $\beta\text{-}LnAl_{11}O_{18}$ are the same as that described above for the body in general; thus the approximate most preferred composition, in volume percent, of these bodies is bounded by and contained within the same three-dimensional solid defined by points a, b, c, d, e, f, g, and h of FIG. 3. Where the reinforcing hard phase of such a body is silicon carbide, the most preferred ranges are narrower. For the $(Ln,Al)_2O_3$ containing body, the preferred ranges are approximately: total oxide phase, 45–68 v/o; $(Ln,Al)_2O_3$ C-type rare earth structure, 4.5–68 v/o; alumina, 0–63.5 v/o; SiC, 30–50 v/o; metal, 2–5 v/o. For the body containing perovskite/β-alumina and silicon carbide reinforcing hard phase, the preferred ranges are approximately: total oxide phase, 45–73 v/o; $LnAlO_3$ rare earth perovskite structure, 0–73 v/o; $LaAl_{11}O_{18}$ β-alumina structure, 0–73 v/o; alumina, 0–40.5 v/o; SiC, 25–50 v/o; metal, 2–5 v/o.

The most preferred ranges for a body in which the binary oxide is a rare earth garnet with a nominal formula $Ln_3Al_5O_{12}$ are also shown graphically in FIG. 3, with the approximate most preferred composition, in volume percent, of the body bounded by and contained within the three-dimensional solid defined by points i, b, c, j, k, f, g, and l of FIG. 3. The approximate volume percents of binary oxide, alumina, reinforcing phase, and metal phase represented by points i, b, c, j, k, f, g, and l are shown in Table I. Where the reinforcing hard phase is silicon carbide, the most preferred ranges are narrower, approximately: total oxide phase, 45–68 v/o; $Ln_3Al_5O_{12}$ rare earth garnet, 10–68 v/o and most preferably 10–30 v/o; alumina, 0–48 v/o; SiC, 30–50 v/o; metal, 2–5 v/o.

TABLE I

| refrnce. ltr.: | a | b | c | d | e | f |
|---|---|---|---|---|---|---|
| binary oxide: | 80 | 40 | 4 | 8 | 88 | 48 |
| alumina: | 0 | 0 | 36 | 72 | 0 | 0 |
| reinf. phase: | 10 | 50 | 50 | 10 | 10 | 50 |
| metal phase: | 10 | 10 | 10 | 10 | 2 | 2 |

| refrnce. ltr.: | g | h | i | j | k | l |
|---|---|---|---|---|---|---|
| binary oxide: | 4.8 | 8.8 | 70 | 7 | 78 | 7.8 |
| alumina: | 43.2 | 79.2 | 0 | 63 | 0 | 70.2 |
| reinf. phase: | 50 | 10 | 20 | 20 | 20 | 20 |
| metal phase: | 2 | 2 | 10 | 10 | 2 | 2 |

The preferred average grain size (equivalent diameter, that is the diameter of a sphere of equal volume to the average grain) of the equiaxed phase grains, that is the oxide phase and equiaxed reinforcing phase, in a densified body of this material for cutting tool use is about 0.1–5 μm; the most preferred, 1.5–2 μm. In other articles for applications where strength requirements are lower, e.g. sand blasting nozzles, a larger grain size for the equiaxed phases, e.g. about 5–20 μm, may prove satisfactory. For elongated grain components, the preferred sizes are about 0.5–1.0 μm fiber or whisker diameter and an aspect ratio of 3:1 to 10:1 (length to diameter). For platelet components, about 0.5–1.0 μm platelet thickness, and a ratio of length to width to thickness of about 3:2:1 to 10:10:1 is preferred.

A typical method for preparation of the bodies described herein involves several steps. In order to obtain a dense ceramic body a mixture of the oxide powders in the desired volume ratio is dry ball milled for 24 hours using alumina milling media, and screened through 80 mesh screen. This base composition is then combined with the reinforcing phase powder, whiskers, fibers, and/or platelets at the desired volume ratios by forming a suspension of the components in methanol. The resulting slurry is then sonicated to disperse any agglomerates, mixed for 5 minutes using a high shear mixer, and pan dried at 65° C. for 16 hours. The dried powder is dry ball milled for 2 hours using polyethylene media and screened through 60 mesh screen.

The mixture then may be densified by methods known to be suitable for alumina-based materials, for example sintering, continuous cycle sintar-plus-HIP, two step sintar-plus-HIP, hot pressing, or hot isostatic pressing, all known in the art. (HIP=hot isostatic pressing.) However, it is important that the nickel and aluminum of the metal phase be added to the mixture to be densified as nickel and aluminum powders rather than as prereacted nickel aluminide, in order to achieve during densification the segregation of the metal phase at the triple points of the microstructure, as described above. For example, the above-described mixture may be hot pressed at a temperature of about 1650°–1850° C. to obtain a dense body. Alternatively, a green compact may be prepared by adding an organic binder to the powder mixture to form a slurry, subsequently removing the binder by drying the slurry to form a dried powder, and pressing the dried powder to form the green compact. The green compact is then densified by hot isostatic pressing.

For certain applications such as cutting tools the articles described herein may be coated with refractory materials to provide certain desired surface characteristics. The preferred coatings have one or more adherent, compositionally distinct layers of refractory metal carbides and/or nitrides, e.g. of titanium, tantalum, or hafnium, and/or oxides, e.g. of aluminum or zirconium, or combinations of these materials as different layers and/or solid solutions. Especially preferred for the oxide based material is an alumina coating, because of its inherent compatibility with its substrate, or a chemical vapor deposited (CVD) diamond coating, because of its exceptional hardness. Both alumina and diamond coatings provide exceptional chemical stability, wear resistance, and high hardness at high temperatures.

When shaped as cutting tools, the bodies described herein may be used for machining of high temperature nickel-based alloys, including those known in the art as superalloys. The following description of the method is directed to an exemplary Inconel alloy, Inconel 718, but is also applicable to other high temperature nickel based, iron based, and cobalt based superalloys as well as to other materials, including difficult-to-work materials. As used herein, the term "difficult-to-work" is intended to refer to the machining characteristics of workpiece materials which are significantly more difficult to work than typical steel workpieces, necessitating slow machining speeds, slow feed rates, and/or shallow depth of cut when machined using conventional tungsten carbide-cobalt cutting tools. Such difficult-to-work materials include high temperature nickel based metal alloys, including the type known in the art as superalloys, as well as other difficult-to-work alloys based on iron and cobalt.

The typical turning or milling speed for such high temperature nickel based materials ranges from as low as 5–20 sfm (surface feet per minute), for milling Inconel superalloys with high speed steel tools, to as high as 30–100 sfm, for turning Inconel superalloys with carbide tools (*Materials Engineering Materials Selector* 90, C88 (1979)), typically tungsten carbide-cobalt tools. Utilization of the above-described ceramic-metal tools, however, permits an unexpectedly large increase in the machining speed, e.g. on the order of one or two orders of magnitude.

In carrying out the method described herein, a bar of Inconel alloy may be turned on a lathe using an alumina ceramic-metal cutting tool as described above. An effective turning speed of up to about 1000 sfm, a feed rate of up to about 0.012 in/rev, and a depth of cut of up to about 0.10 inches may be tolerated by these cutting tools. Alternatively, the method may involve milling, drilling, tapping, reaming, broaching, grooving, threading, or other machining operation using a cutting tool material as described herein. Also alternatively, the workpiece may be another material, including those which are similarly difficult to machine.

The following Examples are presented to enable those skilled in the art to more clearly understand and practice the present invention. These Examples should not be considered as a limitation upon the scope of the present invention, but merely as being illustrative and representative thereof.

EXAMPLE 1

Ceramic-metal bodies were prepared from a powder mixture of 8 v/o metal (86.7 w/o nickel, 13.3 w/o aluminum, each as a powder, approximately corresponding to a $Ni_3Al$ stoichiometric ratio), 27.6 v/o equiaxed solid solution tungsten titanium carbide powder (nominal formula $(W_{0.5}Ti_{0.5})C$), and a mixture of erbium oxide and aluminum oxide powders in an amount to yield 38.6 v/o of $\beta$-$ErAl_{11}O_{19}$ and 25.8 v/o $\alpha$-alumina, as follows:

The oxides, tungsten titanium carbide, nickel, and aluminum powders in the desired ratio were milled in a 500 cc capacity tungsten carbide attritor mill using cemented carbide (WC-Co) milling media for 2 hr at 120 rpm. After milling, the powder was screened through an 80 mesh stainless steel screen. The screened powder was hot pressed in a graphite die at 1750° C. for 80 min at 30.6 MPa pressure in an argon atmosphere.

As shown in Table II, the properties of the resulting bodies were compared to a body similarly prepared, but using only 30 v/o titanium carbide, remainder alumina. As may be seen in Table II, the bodies prepared as described herein exhibited both modulus of rupture and toughness which were superior to those of the alumina tool. The fully dense material exhibited segregation of the metal phase at triple points in the microstructure.

TABLE II

| Sample | Composition | Modulus of Rupture*, MPa | Fracture Toughness**, MPa.m$^{1/2}$ |
|---|---|---|---|
| A | 38.6 v/o $ErAl_{11}O_{19}$ + 25.8 v/o $Al_2O_3$ + 27.6 v/o (W, Ti)C + 8 v/o (Ni, Al) | 710 | 4.5 |
| B | $Al_2O_3$ + 30 v/o TiC | 400 | 3.5 |

*Measured by the standard 4-Point Bend Test.
**Measured by the standard indentation method.

The present invention provides novel improved materials exhibiting high thermal stability, high hardness, fracture toughness, and strength, and high wear resistance and impact resistance. These materials are suitable for such applications as high temparature structural materials or as wear resistant materials in applications such as sand blasting nozzles, pump seals, cutting tools, and the like.

While there have been shown and described what are at present considered the preferred embodiments of the invention, it will be obvious to those skilled in the art that various changes and modifications can be made therein without departing from the scope of the invention as defined by the appended Claims.

I claim:

1. A ceramic-metal body having a density of at least about 95% of theoretical density, said body comprising:

about 40–88 volume percent of an oxide hard phase consisting essentially of, in volume percent based on the total volume of said body, about 4–88 volume percent of at least one M-aluminum binary oxide having a crystal structure selected from the group consisting of C-type rare earth, garnet, $\beta$-$MAl_{11}O_{18}$, or perovskite, wherein M is selected from the group consisting of lanthanides and indium; 0 to about 79 volume percent of granular $\alpha$-alumina; and 0 to less than 5 volume percent of one or more other oxides selected from the group consisting of magnesia, zirconia, yttria, hafnia, and silica;

about 10–50 volume percent of a refractory reinforcing hard phase consisting essentially of one or more materials selected from the group consisting of carbides, nitrides, oxycarbides, and oxynitrides of titanium, zirconium, hafnium, niobium, tantalum, tungsten, and silicon; borides of titanium, tantalum, hafnium, and tungsten; and combinations thereof; and about 2–10 volume percent of a metal phase consisting essentially of a combination of nickel and aluminum having a ratio of nickel to aluminum of from about 70:30 to about 90:10 by weight and 0–5 weight percent of an additive selected from the group consisting of titanium, zirconium, hafnium, vanadium, niobium, tantalcum, chromium, molybdenum, tungsten, cobalt, boron, carbon, and combinations thereof; wherein said metal phase is a non-continuous, dispersed metal phase, and at least a major portion of said non-continuous, dispersed metal phase is segregated at triple points defined by grain surfaces of said hard phases.

2. A body in accordance with claim 1 wherein said reinforcing hard phase comprises equiaxed particles in an amount of no more than 20 volume percent of said body, the remainder of said reinforcing hard phase being platelets, elongated grains, or a combination thereof.

3. A body in accordance with claim 1 wherein said at least one M-aluminum binary oxide consists essentially of a combination of a lanthanide-aluminum binary oxide having a rare earth perovskite crystal structure and a lanthanide-aluminum binary oxide having a $\beta$-NaAl$_{11}$O$_{17}$ crystal structure.

4. A body in accordance with claim 1 wherein the composition, in volume percent, of said body is bounded by and contained within the three-dimensional solid defined by points a, b, c, d, e, f, g, and h of FIG. 3.

5. A body in accordance with claim 4 wherein said at least one M-aluminum binary oxide consists essentially of (In, Al)$_2$O$_3$ having a C-type rare earth crystal structure.

6. A body in accordance with claim 5 wherein said reinforcing hard phase consists essentially of silicon carbide, and said body comprises:

about 45–68 volume percent of said oxide hard phase consisting essentially of, in volume percent based on the total volume of said body, about 4.5–68 volume percent of said (In,Al)$_2$O$_3$; 0 to about 61 volume percent of said alumina; and 0 to less than 5 volume percent of said one or more other oxides;

about 30–50 volume percent of said silicon carbide; and about 2–5 volume percent of said metal phase.

7. A body in accordance with claim 4 wherein said at least one M-aluminum binary oxide consists essentially of a combination of LnAl$_3$O$_9$ having a rare earth perovskite crystal structure and LnAl$_3$O$_9$ having a $\beta$-NaAl$_{11}$O$_{17}$ crystal structure, wherein Ln is a lanthanide.

8. A body in accordance with claim 7 wherein said reinforcing hard phase consists essentially of silicon carbide, and said body comprises:

about 45–73 volume percent of said oxide hard phase consisting essentially of, in volume percent based on the total volume of said body, 0 to about 73 volume percent of said LnAlO$_3$; 0 to about 73 volume percent of said LnAl$_3$O$_9$; 0 to about 40.5 volume percent of said alumina; and 0 to less than 5 volume percent of said one or more other oxides;

about 25–50 volume percent of said silicon carbide; and about 2–5 volume percent of said metal phase.

9. A body in accordance with claim 1 wherein said at least one M-aluminum binary oxide consists essentially of Ln$_3$Al$_5$O$_{12}$ having a rare earth garnet crystal structure; Ln is a lanthanide; and the composition, in volume percent, of said body is bounded by and contained within the three-dimensional solid defined by points i, b, c, j, k, f, g, and l of FIG. 3.

10. A body in accordance with claim 9 wherein said reinforcing hard phase consists essentially of silicon carbide, and said body comprises:

about 45–68 volume percent of said oxide hard phase consisting essentially of, in volume percent based on the total volume of said body, about 10–68 volume percent of said Ln$_3$Al$_5$O$_{12}$; 0 to about 48 volume percent of said alumina; and 0 to less than 5 volume percent of said one or more other oxides;

about 30–50 volume percent of said silicon carbide; and about 2–5 volume percent of said metal phase.

11. A body in accordance with claim 1 wherein said reinforcing hard phase is present in the form of platelets or elongated grains.

12. A body in accordance with claim 11, wherein at least a portion of said reinforcing hard phase is present as silicon carbide, and at least a portion of said silicon carbide is partially incorporated into grains of said oxide phase and bridges the grain boundaries of the microstructure of said body.

13. A body in accordance with claim 11 wherein said reinforcing hard phase is present in the form of single crystal whiskers having an average aspect ratio of length to diameter between 3:1 and 10:1 or in the form of platelets having an average ratio of length to width to thickness between about 3:2:1 and about 10:10:1.

14. A body in accordance with claim 1 wherein said metal phase comprises a combination of a Ni$_3$Al ordered crystal structure, or a Ni$_3$Al ordered crystal structure coexistent with or modified by said additive, and one or more nickel-aluminum alloys.

15. A body in accordance with claim 1 wherein said body is coated with one or more adherent, compositionally distinct layers, each layer being a material or solid solution of materials selected from the group consisting of carbides, nitrides, and carbonitrides of titanium, zirconium, hafnium, vanadium niobium tantalum, chromium, and molybdenum, oxides of aluminum and zirconium, and diamond.

16. A method for machining a workpiece comprising the steps of:

turning said workpiece on a lathe at an effective cutting speed of up to about 1000 surface feet per minute;

moving a ceramic-metal cutting tool across the face of said workpiece at a feed rate of up to about 0,012 inches per revolution; and cutting said workpiece with said ceramic-metal cutting tool to effect a depth of cut of up to about 0.10 inches per pass;

wherein said ceramic-metal cutting tool has a density of at least about 95% of theoretical, and comprises:

about 40–88 volume percent of an oxide hard phase consisting essentially of, in volume percent based on the total volume of said cutting tool, about 4–88 volume percent of at least one M-aluminum binary oxide having a crystal structure selected from the group consisting of C-type rare earth, garnet, $\beta$-MAl$_{11}$O$_{18}$, or perovskite, wherein M is selected from the group consisting of lanthanides and indium; 0 to about 79 volume percent of granular $\alpha$-alumina; and 0 to less than 5 volume percent of one or more other oxides selected from the group consisting of magnesia, zirconia, yttria, hafnia, and silica;

about 10–50 volume percent of a refractory reinforcing hard phase consisting essentially of one or more materials selected from the group consisting of carbides, nitrides, oxycarbides, and oxynitrides of titanium, zirconium, hafnium, niobium, tantalum, tungsten, and silicon; borides of titanium, tantalum, hafnium, and tungsten; and combinations thereof; and about 2–10 volume percent of a metal phase consisting essentially of a combination of nickel and aluminum having a ratio of nickel to aluminum of from about 70:30 to about 90:10 by weight and 0–5 weight percent of an additive selected from the group consisting of titanium, zirconium, hafnium, vanadium, niobium, tantalum, chromium, molybdenum, tungsten, cobalt, boron, carbon, and combinations thereof; wherein said metal phase is a non-continuous, dispersed metal phase, and at least a major portion of said non-continuous, dispersed metal phase is segregated at triple points defined by grain surfaces of said hard phases.

17. A method in accordance with claim 16 wherein said metal phase comprises a combination of a Ni$_3$Al ordered crystal structure, or a Ni$_3$Al ordered crystal structure coexistent with or modified by said additive, and one or more nickel-aluminum alloys.

18. A method in accordance with claim 16 wherein said cutting tool is coated with one or more adherent, compositionally distinct layers, each layer being a material or solid solution of materials selected from the group consisting of carbides, nitrides, and carbonitrides of titanium, zirconium, hafnium, vanadium, niobium, tantalum, chromium, and molybdenum, oxides of aluminum and zirconium, and diamond.

19. A method for the preparation of a ceramic-metal body comprising the steps of:

preparing a mixture comprising (a) about 40–88 volume percent of hard refractory oxide components consisting essentially of, in volume percent based on the total volume of said body, about 4–88 of at least one M-aluminum binary oxide having a crystal structure selected from the group consisting of C-type rare earth, garnet, β-$MAl_{11}O_{18}$, or perovskite, wherein M is selected from the group consisting of lanthanides and indium; 0 to about 79 volume percent of granular α-alumina; and 0 to less than 5 of one or more other oxides selected from the group consisting of magnesia, zirconia, yttria, hafnia, and silica; (b) about 10–50 volume percent of one or more hard refractory reinforcing components selected from the group consisting of carbides, nitrides, oxycarbides, and oxynitrides of titanium, zirconium, hafnium, niobium, tantalum, tungsten, and silicon; borides of titanium, tantalum, hafnium, and tungsten; and combinations thereof; and (c) about 2–10 volume percent of a metal component consisting essentially of a combination of nickel powder and aluminum powder having a ratio of nickel powder to aluminum powder of from about 70:30 to about 90:10 by weight and 0–5 weight percent of an additive selected from the group consisting of titanium, zirconium, hafnium, vanadium, niobium, tantalum, chromium, molybdenum, tungsten, cobalt, boron, carbon, and combinations thereof; and densifying said mixture to form a ceramic metal body having a density of at least 95% of theoretical density and having a granular microstructure within which said metal component forms a non-continuous, dispersed metal phase, at least a major portion of said non-continuous, dispersed metal phase being segregated at triple points defined by grain surfaces of said granular microstructure.

20. A method in accordance with claim 19 wherein said reinforcing components comprise equiaxed particles in an amount of no more than 20 volume percent of said body, the remainder of said reinforcing components being platelets, elongated grains, or a combination thereof.

21. A method in accordance with claim 19 wherein said densifying step comprises densifying said mixture by sintering, continuous cycle sinterhiping, two step sintering-plus-HIPing, hot pressing, or hot isostatic pressing to form said body.

22. A method in accordance with claim 19 wherein said densifying step comprises the sub-steps of:

adding an organic binder to said mixture to form a slurry;

drying said slurry to remove said binder and form a dried powder;

pressing said dried powder to form a green compact; and densifying said green compact by hot isostatic pressing.

23. A method in accordance with claim 19 wherein said reinforcing hard phase comprises silicon carbide platelets or elongated grains; and during said densifying step at least a portion of said silicon carbide platelets or elongated grains is partially incorporated into grains of said oxide component and bridges the grain boundaries of said granular microstructure.

* * * * *